(12) United States Patent
Chen et al.

(10) Patent No.: US 9,681,132 B2
(45) Date of Patent: Jun. 13, 2017

(54) METHODS AND APPARATUS FOR ADAPTIVE LOOP FILTERING IN VIDEO ENCODERS AND DECODERS

(75) Inventors: Qian Chen, Santa Clara, CA (US); Yunfei Zheng, Cupertino, CA (US); Peng Yin, Ithaca, NY (US); Xiaoan Lu, Princeton, NJ (US); Joel Sole, La Jolla, CA (US)

(73) Assignee: Thomson Licensing DTV, Issy les Moulineaux (FR)

( * ) Notice: Subject to any disclaimer, the term of this patent is extended or adjusted under 35 U.S.C. 154(b) by 742 days.

(21) Appl. No.: 13/988,470

(22) PCT Filed: Nov. 22, 2011

(86) PCT No.: PCT/US2011/061854
§ 371 (c)(1),
(2), (4) Date: May 20, 2013

(87) PCT Pub. No.: WO2012/071417
PCT Pub. Date: May 31, 2012

(65) Prior Publication Data
US 2013/0243104 A1    Sep. 19, 2013

Related U.S. Application Data

(60) Provisional application No. 61/416,926, filed on Nov. 24, 2010.

(51) Int. Cl.
*H04N 7/12* (2006.01)
*H04N 19/86* (2014.01)
(Continued)

(52) U.S. Cl.
CPC ....... *H04N 19/00909* (2013.01); *G06T 5/002* (2013.01); *H04N 19/439* (2014.11);
(Continued)

(58) Field of Classification Search
CPC ............. G06T 5/002; H04N 19/00909; H04N 19/439; H04N 19/51; H04N 19/82; H04N 19/86
(Continued)

(56) References Cited

U.S. PATENT DOCUMENTS 5,920,356 A   7/1999 Gupta et al.
7,242,815 B2  7/2007 Kalevo et al.
(Continued)

FOREIGN PATENT DOCUMENTS

JP    2011139208    7/2011

OTHER PUBLICATIONS

Tsai et al., "TE10 Subset2: Coding Unit Synchronous Picture Quadtree-based adaptive loop filtert (QALF)" Joint Collaborative Team on Video Coding (JCT-VC) of ITU-T SG16 WP3 and ISO/IEC JTC1/SC29/WG11, MPEG Mtg Oct. 7-15, 2010, No. M19169, Oct. 28, 2010, 12.*
(Continued)

*Primary Examiner* — Jessica M Prince
(74) *Attorney, Agent, or Firm* — Brian J. Dorini; Xiaoan Lu

(57) ABSTRACT

Various implementations provide filtering for pictures. Several such implementations attempt to reduce artifacts caused by over-filtering in a decoding loop. Certain of these implementations provide multiple loop filters, and select a loop filter based on the result of a deblocking 5 filter. One particular implementation applies a first filter to a picture to produce a filtered picture. A second filter is selected based on a difference between a value of a particular pixel in the filtered picture and a value of a corresponding pixel in the picture. The second filter is applied to the particular pixel in the filtered picture. In another implementation, a signal or signal structure includes 10 an indication of the second filter,
(Continued)

an encoding of at least a portion of a picture, and an encoding of at least a portion of a subsequent picture that has been encoded based on the output of the second filter above.

29 Claims, 6 Drawing Sheets

(51) Int. Cl.
*G06T 5/00* (2006.01)
*H04N 19/51* (2014.01)
*H04N 19/82* (2014.01)
*H04N 19/42* (2014.01)

(52) U.S. Cl.
CPC .............. *H04N 19/51* (2014.11); *H04N 19/82* (2014.11); *H04N 19/86* (2014.11)

(58) Field of Classification Search
USPC .................................................. 375/240.29
See application file for complete search history.

(56) References Cited

U.S. PATENT DOCUMENTS

| | | | |
|---|---|---|---|
| 2008/0240252 A1* | 10/2008 | He | H04N 19/176 375/240.24 |
| 2009/0087096 A1* | 4/2009 | Eaton | G06K 9/38 382/190 |
| 2009/0327386 A1 | 12/2009 | Schoenblum | |
| 2010/0177822 A1 | 7/2010 | Karczewicz et al. | |
| 2011/0274158 A1* | 11/2011 | Fu | H04N 19/115 375/240.02 |

OTHER PUBLICATIONS

Tsai et al., "TE10 Subset2:Coding Unit Synchronous Picture Quadtree-based adaptive loop filter (QALF)" Joint Collaborative Team on Video Coding (JCT-VC) of ITU-T SG16 WP3 and ISO/IEC JTC1/SC29/WG11, MPEG mtg Oct. 7-15, 2010, No. M19169 Oct. 28, 2010,12.*
Chen et al., "Classified Quadtree-based Adaptive Loop Filter," 2011 IEEE Int'l. Conference on Multimedia and Expo (ICME), Jul. 11, 2011, pp. 1-6.
Liu, "Adaptive Post/Loop Filters in JM/KTA—Part 2", H265.net, Aug. 23. 2009.
Huang et al., "In-Loop Adaptive Restoration," JCT-VC Mtg. Jul. 21-28, 2010, Joint Collaborative Team on Video Coding (JCT-VC) of ITU-T SG16 and ISO/IEC JTC1/SC29/WG11, No. JCTVC-B077, Jul. 25, 2010, 11 pages.
Yamakage et al., "Tool Experiment 10: In-loop filtering," JCT-VC Mtg. Jul. 21-28, 2010, Geneva, Joint Collaborative Team on Video Coding of ISO/IEC JTC1/SC29/WG11 and ITU-T SG16, No. JCTVC-B310, Aug. 30, 2010. 15 pages.
Tsai et al., "TE10 Subtest 2: Coding Unit Synchronous Picture Quadtree-based adaptive loop filter (QALF)", Joint Collaborative Team on Video Coding (JCT-VC) of ITU-T SG16 WP3 and ISO/IEC JTC1/SC29/WG11, MPEG Mtg Oct. 7-15, 2010, No. M18169, Oct. 28, 2010, 12.
Liu et al., "Unified Loop filter for Video Coding," MPEG Mtg. Jan. 18-22, 2010, Kyoto, ISO/IEC JTC1/SC29/WG11, No. M17171, Jan. 16, 2010, 10 pages.
List et al., "Adaptive Deblocking Filter", IEEE Transactions on Circuits and Systems for Video Technology, vol. 13, No. 7, Jul. 2003, pp. 614-619.
Chujoh et al., "Block-based Adaptive Loop Filter", ITU-Telecommunications Standardization Sector, Study Group 16, Question 6, Video Coding Experts Group, Doc.: VCEG-Al18, 35th Meeting. Berlin, DE, Jul. 16-18, 2008, pp. 1-6.
Jung et al., "Description of video coding technology proposal by France Telecom, NTT, NTT DOCOMO, Panasonic and Technicolor", Joint Collaborative Team on Video Coding of ITU-T SG16 WP3 and ISO/IEC JTC1/SC29/WG11, Doc.: JCTVC-A114, 1st Meeting, Dresden, DE, Apr. 15-23.
Yang, "Image/Video Processing Techniques: Header Compression and Post-Processing", Thesis submitted to The Hong Kong University of Science and Technology in partial fulfillment for a Master's Degree in Philosophy in the Department of Electronic and Computer Engineering, May.
Ikai et al., "A parallel adaptive loop filter," JCT-VC Mtg. Jul. 21-28, 2010, Joint Collaborative Team on Video Coding of ISO/IEC JTC1/SC29/WG11 and ITU-T SG16, No. JCTVC-B064, Jul. 23, 2010, 11 pages.
ITU-Telecommunications Standardization Sector, "Post-filter with reduced delay requirements", Study Group 16—Contribution 128-E, Source: Qualcomm Inc., Jan. 2009, pp. 1-4.
ITU-Telecommunications Standardization Sector, "Quadtree-based adaptive loop filter", Study Group 16—Contribution 181-E, Source: Toshiba Corp., Jan. 2009, pp. 1-4.
Shao, "Unified compression artifacts removal based on adaptive learning on activity measure", Digital Signal Processing 17 (2007), available online at www.sciencedirect.com, Elsevier, pp. 1065-1070.
Karczewicz et al., "Video coding technology proposal by Qualcomm Inc.", Joint Collaborative Team on Video Coding of ITU-T SG16 WP3 and ISO/IEC JTC1/SC29/WG11, Doc.: JCTVC-A121, 1st Meeting, Dresden, DE, Apr. 15-23, 2010, pp. 1-24.
Search Report Dated May 15, 2012.

* cited by examiner

METHODS AND APPARATUS FOR ADAPTIVE LOOP FILTERING IN VIDEO ENCODERS AND DECODERS

CROSS-REFERENCE TO RELATED APPLICATIONS

This application claims the benefit, under 35 U.S.C. §365 of International Application PCT/US2011/061854, filed Nov. 22, 2011, which was published in accordance with PCT Article 21(2) on May 31, 2012 in English and which claims the benefit of United States provisional patent application No. 61/416,926, filed Nov. 24, 2010.

TECHNICAL FIELD

Implementations are described that relate to filtering. Various particular implementations relate to filtering applied to a coding environment.

BACKGROUND

Many video coding standards employ block-based transforms and motion compensation to achieve compression efficiency. Due to the lossy-compression property of the framework, the quality of the reconstructed videos will typically be degraded. A deblocking filter is generally applied to the decoded picture for removing blocky artifacts. Additional filters are typically used in-loop or out-of-loop to improve the quality of the decoded pictures. These additional filters can cause degradation in the output picture, however.

SUMMARY

According to a general aspect, a first filter is applied to at least a portion of a picture to produce a filtered picture. A second filter is selected based on a difference between a value of a particular pixel in the filtered picture and a value of a corresponding pixel in the picture. The second filter is applied to the particular pixel in the filtered picture.

According to another general aspect, a signal or signal structure includes a first picture portion that has an encoding of at least a portion of a picture. The signal or signal structure also includes a second picture portion that has an encoding of at least a portion of a subsequent picture. The portion of the subsequent picture has been encoded based on a version of the picture having a twice-filtered pixel. The twice-filtered pixel is produced by (i) using a first filter to filter a particular pixel in the picture to produce a filtered pixel and (ii) using a second filter to filter the filtered pixel to produce the twice-filtered pixel. The signal or signal structure also includes a filter indication portion that has an indication of the second filter. The second filter has been selected based on a difference between a value of the particular pixel from the picture and a value of the filtered pixel.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
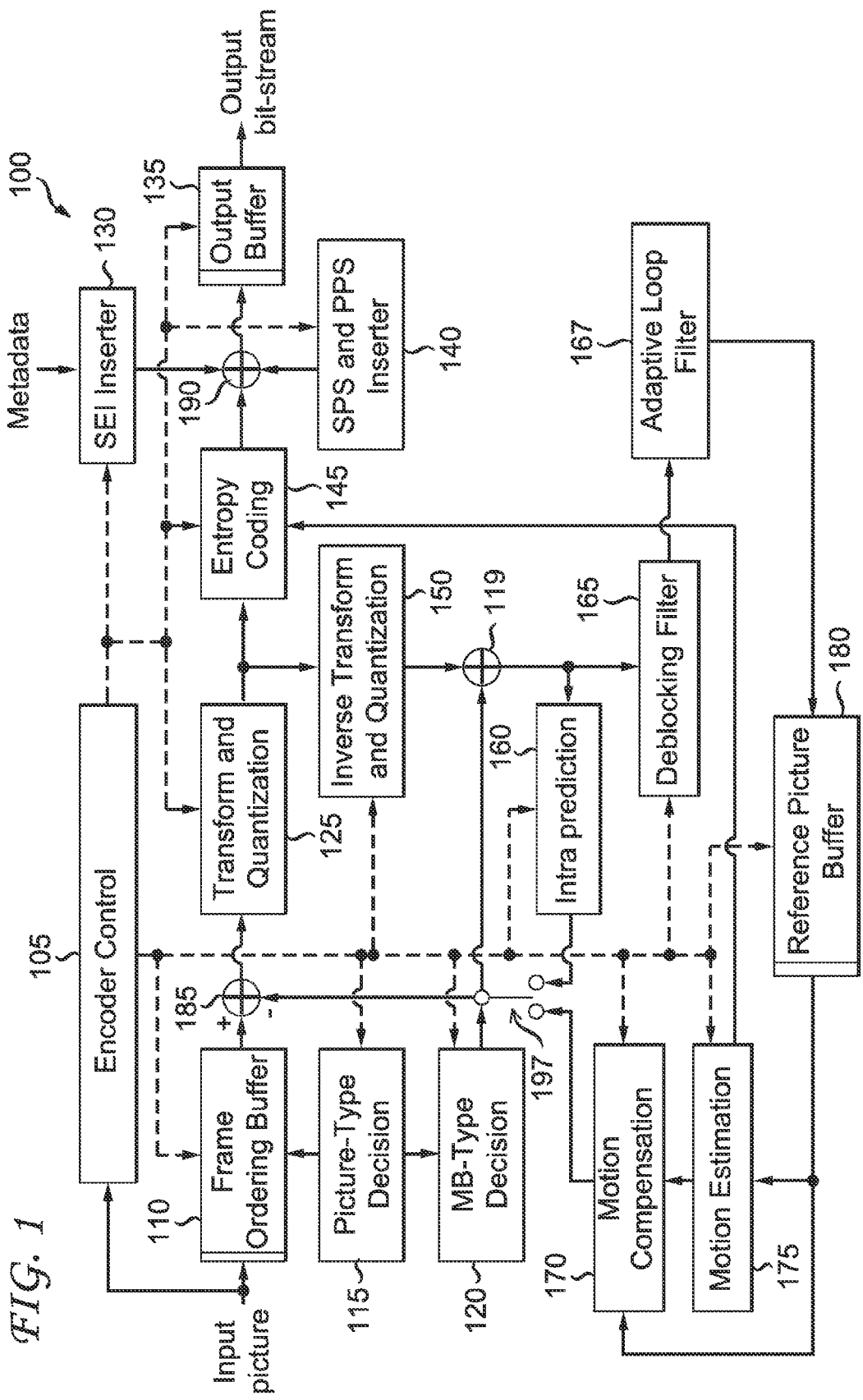
FIG. 1 is a block/flow diagram depicting an implementation of an encoder and an encoding process.

Video coding standards employ block-based transforms (e.g., DCTs) and motion compensation to achieve compression efficiency. Due to the lossy-compression property of the framework, the quality of the reconstructed videos will typically be degraded. In H.264/AVC, a deblocking filter is applied to the decoded picture for removing blocky artifacts. In the Key Technology Area (KTA) of H.264/AVC, Wiener filters are used in-loop or out-of-loop to improve the quality of the decoded pictures. Wiener filters are well-known optimal linear filters used to cope with the pictures degraded by Gaussian noise, blurring, and distortion. However, though Wiener filters may restore the decoded image to the original image globally, the output of the Wiener filter can often include degraded pixels locally. If these degraded areas are not filtered, the capability of the loop filtering is improved. Hence, in a reference hereinafter referred to as the 'Chujoh/Watanabe' reference, a block-based adaptive in-loop filter (BALF) is proposed to apply a filter to luminance blocks, and for each block, one flag is used to signal whether the block will be filtered.

A reference hereinafter referred to as the c reference describes a way to further improve filter performance by applying a filter to variable-size blocks, and providing a signaling scheme in a quadtree data structure.

Further, based on the QALF scheme, a reference hereinafter referred to as the 'Karczewicz/Chen' reference proposes using a set of M filters. Instead of using a single filter in QALF, a set of M filters is transmitted to the decoder for each frame or a group of frames (GOP). The idea of M filters is to first classify picture pixels to different categories, and apply a respective filter to each category. The M filters take a local characteristic of a frame into account, and enhance the adaptive loop filter (ALF) performance.

A reference hereinafter referred to as the 'Amonou' reference describes a scheme employing multiple references to improve the performance of an adaptive in-loop filter. For each filtered signal, it has three co-located samples in a prediction frame, a reconstructed frame, and a quantization error frame respectively. However, in ALF, only a reconstructed frame signal is used to estimate the signal.

In the Key Technology Area (KTA) of H.264/AVC, an adaptive post filter was suggested in a reference hereinafter referred to as the 'Karczewicz/Motta' reference. The basic idea behind the Karczewicz/Motta scheme is to apply a Wiener filter to the decoded picture before display. The Wiener filter can be estimated for each picture by minimizing the mean square error (MSE) between the original picture and the decoded picture at an encoder. In this case, the estimated filter coefficients are sent to the decoder as the overhead. The whole picture is filtered with the estimated filter. In another embodiment, a set of Wiener filters are trained offline, and transmitted to or stored at a decoder. During decoding, the picture is filtered pixel-wise. At each pixel, a filter is selected from the filter set based on the surrounding pixels' statistics. In this technique, the filtering indicator does not cost any overhead. It can be derived by the decoded picture content. However, a useful model between a filtering indicator and the picture content is typically hard to build. In the Karczewicz/Motta scheme, an offline training system is exploited to find the corresponding model between the filtering indicator and the local variance. Since the training is highly dependent on the training set, the model that is trained with limited data typically will be inaccurate for more general video signals.

In Chujoh/Watanabe, a block-based adaptive loop filter is proposed. In their proposal, a reconstructed frame is restored by a Wiener filter towards the original frame. The Wiener filter coefficients are estimated at the encoder and sent to the decoder as side information. Although a Wiener filter may restore the reconstructed frame to the original frame globally, there are degraded pixels locally because the filter is optimized in an average mean square error sense. Because the degraded areas reduce either the prediction efficiency for future coding frames or the visual quality of the picture, not filtering these areas may improve the coding performance and subjective quality. In Block Adaptive Loop Filter (BALF), the frame is partitioned into equal-size blocks, a switch flag for each block is used to control whether the block is filtered or not. In Chujoh/Wada, quadtree adaptive loop filter (QALF) is introduced to indicate whether a variable-size block of a frame is filtered or not. When using the variable-size block scheme, the overhead for coding the size and location of blocks would be demanding though the filter performance is generally better than for an equal-size block scheme. However, even the quadtree based filtering typically still does not efficiently remove the compression artifacts, as it is typically unable to capture the spatial characteristics of 2D (two-dimensional) data with only one filter for the whole picture.

In Karczewicz/Chen, a set of M filters are proposed instead of a single filter that is used in QALF. The set of M filters is transmitted to the decoder for each frame or a group of frames (GOP). Whenever the QALF segmentation map indicates that a block should be filtered, for each pixel in that block, a specific filter from the set is chosen based on a measure of a local characteristic of an image, called an activity measure, which is the sum-modified Laplacian measure. M filters are used to capture the local characteristic of a frame, and the different filters are adaptively applied to pixels in different categories. However, for each category, only one reference is employed for filter design, thus possibly resulting in filtering inefficiency and inaccuracy.

The Amonou reference describes a scheme in which multiple references are used to improve the performance of an adaptive in-loop filter. For each filtered signal, it has three co-located samples in a prediction frame, a reconstructed frame, and a quantization error frame, respectively. However, it does not take the local characteristics of pixels into account. Like QALF, it is unable to capture the spatial characteristics of 2D data with only one filter for the whole picture.

We have noted the limitations, inefficiencies, and areas ripe for improvement associated with all of the above-recited schemes and therefore have developed various implementations reflecting at least one new improved filtering scheme. We refer to various implementations, and their filtering methodology, with the term classified quadtree based adaptive filtering. This filtering approach improves upon previous schemes, in at least particular implementations, by being able to use multiple filters, and use multiple reference schemes. This results, for at least particular implementations, in improved video encoding and decoding performance.

In accordance with at least one embodiment, the classified quadtree-based adaptive in-loop filter (CQALF) leverages the advantages offered by both multiple filter schemes and multiple reference schemes. For each coded frame after a deblocking filter, pixels are classified into two categories, those touched by a deblocking filter and those untouched, and a set of filter coefficients is designed for each category. For deblocking-filter-touched pixels, the adaptive loop filter employs two references, the frame as it exists before the deblocking filter and the frame as it exists after the deblocking filter. A weighted sum of the two reference frames is used to train the first set of filter coefficients. For deblocking-filter-untouched pixels, only one reference, the frame after the deblocking filter (for example) is employed to train the second set of filter coefficients. CQALF differentiates frame pixels between deblocking-filter-touched pixels and untouched pixels, to correct or reduce the over-filtering problem caused by the use of a deblocking filter.

Note that the over-filtering problem is addressed, in at least one implementation, by basing the filter design on at least some information from before the deblocking filter. For example, in one implementation, if the deblocking filter changes a pixel, then the CQALF uses a filter for that pixel that is based on at least some information from before the deblocking filter. Thus, information from before the possible occurrence of the "over-filtering" is used to design the loop filter.

Figure 2:
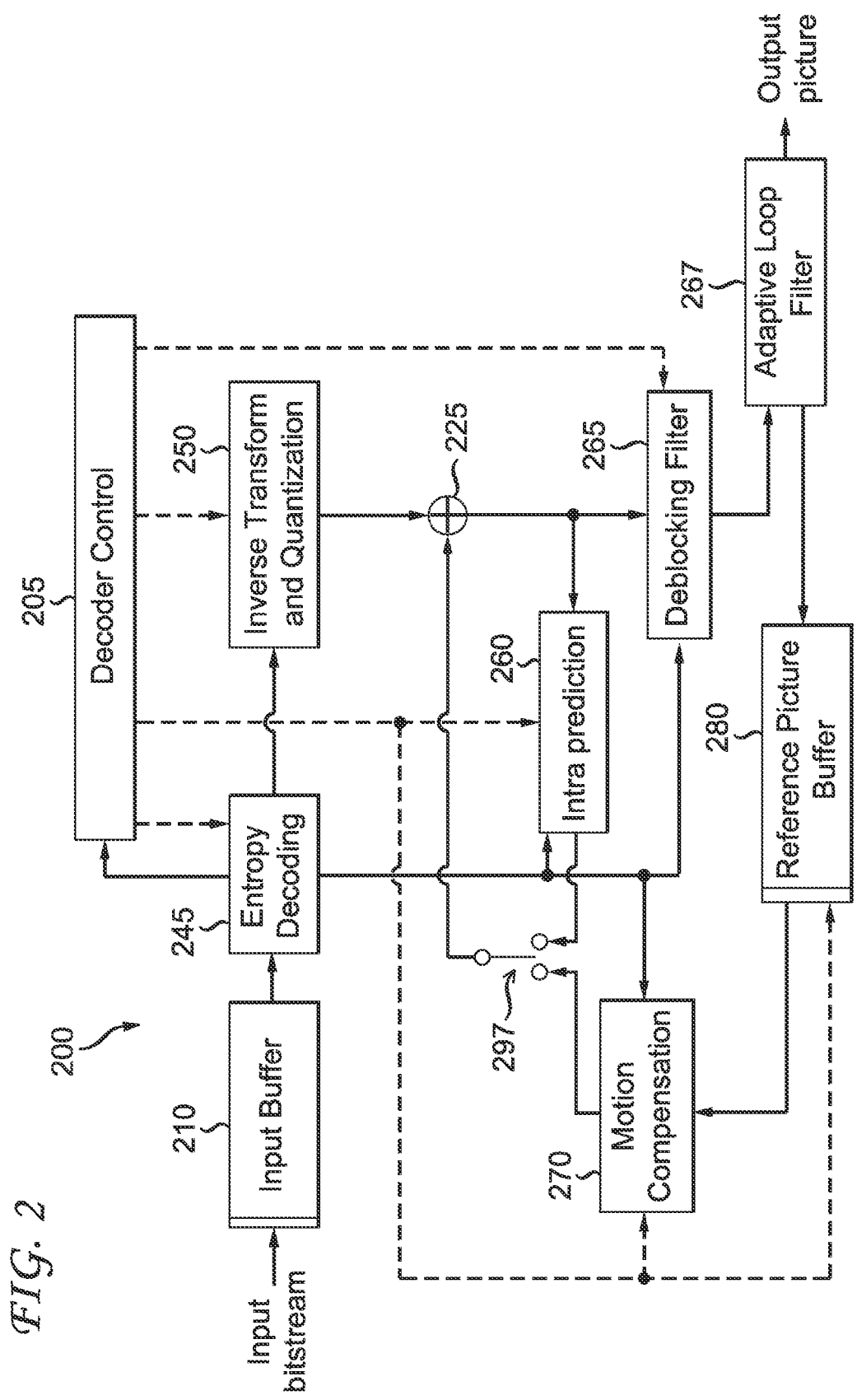
FIG. 2 is a block/flow diagram depicting an implementation of a decoder and a decoding process.

Various implementations described in this application can be applied to a coding environment, as well as (or in the alternative) to other environments. FIGS. 1 and 2 show an implementation one possible coding environment. Certain implementations relate particularly to the adaptive loop filters provided in FIGS. 1 and 2.

Referring to FIG. 1, an exemplary video encoder to which the present principles may be applied is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165.

An output of the deblocking filter 165 is connected in signal communication with an input of an adaptive loop filter 167. An output of the adaptive loop filter is connected in signal communication with an input of a reference picture buffer 180.

An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Referring to FIG. 2, an exemplary video decoder to which the present principles may be applied is indicated generally by the reference numeral 200. The video decoder 200 includes an input buffer 210 having an output connected in signal communication with a first input of an entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260.

An output of the deblocking filter 265 is connected in signal communication with an input of an adaptive loop filter 267. The adaptive loop filter 267 is, for example, the same as the adaptive loop filter 167. An output of the adaptive loop filter 267 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the deblocking filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A second output of the adaptive loop filter 267 is available as an output of the decoder 200, for outputting an output picture.

In a hybrid video coding framework, filtering techniques are usually used to remove compression artifacts or distortion for obtaining higher quality video frames for displaying or serving as references for other frames. The filtering techniques can be used as in-loop or out-of-loop in many video compression applications. Due to the non-stationarity of video signals, the filtering processes are expected to be adaptive in both spatial and temporal domains. Many block-based adaptive filtering schemes have been proposed to achieve spatial and temporal adaptation with increasing complexity at both the encoder and the decoder. The inventors have identified an opportunity to improve upon the current landscape of choices and have developed, as one possible improvement that is exemplified in various implementations, a classified quadtree-based adaptive loop filter (CQALF) for video coding and decoding. In various implementations of the CQALF, pixels in a picture are classified into at least two categories, which we describe as i) a deblocking-filter-touched category and ii) a deblocking-filter-untouched category. Appropriate filters (such as Wiener linear filters) are carefully designed for each category. For deblocking-filter-touched pixels, the CQALF of various implementations employs two references, which are the coding frames before the deblocking filter and after the deblocking filter. A weighting factor (') indicates the ratio of the two references in the filter. For deblocking-filter-untouched pixels, the CQALF of various implementations employs only the coding frame after the deblocking filter as reference.

In accordance with at least one implementation, we have developed a method and apparatus for classified quadtree-based adaptive in-loop filtering. Deblocking filtering may cause an over-filtering problem, particularly for pixels on a block boundary. To address this over-filtering possibility, the inventors determined that it was not necessarily useful to process all of the pixels in a reconstructed frame with a single set of filter coefficients. Rather, the inventors determined that at least in certain circumstances, a better idea is to distinguish deblocking-filter-touched pixels and those pixels that were untouched by the deblocking filter, and to apply a different set of filter coefficients (that is, a different filter) to each kind respectively.

It is straightforward to classify the reconstructed frame pixels into two categories. According to the filtering rule that is applied by a typical deblocking filter, only some pixels (especially around the block boundaries) are filtered, while the rest are left unfiltered. We compare reconstructed frames before deblocking filtering (denoted as s') with reconstructed frames after deblocking filtering (denoted as s") pixel by pixel. Those not equal in two frames are in the deblocking-filter-touched category (also referred to as deblocking-touched or as touched), and those exactly the same are in the deblocking-filter-untouched category (also referred to as deblocking-untouched or as untouched). For illustration, we denote the deblocking-filter-touched category as Category I, and the deblocking-untouched category as Category II.

TABLE 1

| QP | I | P | B |
|---|---|---|---|
| QP ≤ 25 | 0.9 | 0.5 | 0.5 |
| QP > 25 | 0.5 | 0.5 | 0.5 |

Note that for Category I, each pixel has two references (s' and s"), on which we will apply the filter. To save bit rate, we apply the same set of filter coefficients to both references instead of using two sets of filter coefficients. However, we deploy a weighting factor ω to manually tune the ratio of the two references in the filtering process. In experiments, we find the relationship between the weighting factor, ω, and the QP (that is, the quantization parameter). That relationship is shown, for at least one implementation, in Table 1. QP is the quantization step size used in the block 125 and the block 150 of FIG. 1. For different frame types (for example, I, P, and B frame types), the optimal value for ω varies with QP. In an encoding process of at least one implementation, the ω value is table driven using values from Table 1 based on the encoding frame type and the QP setting. Thus, by carefully selecting the weighting factor ω, we can achieve better performance under certain QP values.

TABLE 2

| ω | IPPPPP | Hierarchical-B |
|---|---|---|
| 0 | 0.55 | 0.18 |
| 0.1 | 0.90 | 0.43 |
| 0.3 | 1.51 | 1.20 |
| 0.5 | 1.76 | 1.38 |
| 0.7 | 1.76 | 1.26 |
| 0.9 | 1.37 | 0.81 |
| 1.0 | 1.22 | 0.59 |

Table 2 shows the average coding gain achieved under varying values for the weighting factor ω in IPPPPP mode and in Hierarchical-B mode. The coding gain of Table 2 provides the bitrate percentage change of CQALF over QALF. Table 2 shows that ω=0.5 is a good selection for both modes, as seen by the fact that setting ω=0.5 results in the maximum average gain for both the IPPPPP mode (with an average gain of 1.76) and the Hierarchical-B mode (with an average gain of 1.38). Various implementations simply use a value for the weighting factor ω of 0.5, and need not optimize nor transmit the weighting factor ω. Thus, in at least one implementation, the weighting factor is set to 0.5 regardless of the frame type and the value of QP. In contrast, in at least one other implementation, the weighting factor is set based on the frame type and the value of QP, as shown by Table 1.

On the other hand, only one reference s" is used for Category II. Note that either s' or s" can be used as the reference, because the pixels are of equal value. Indeed, in various implementations, each is used as a reference. However, for at least one implementation, we choose to filter on the reconstructed frame after deblocking because the other pixels involved in the filtering, usually those within the filter window around the filtered pixel, are generally of better quality in s" than in s'. This observation is based on the fact that the reconstructed frame after deblocking filtering shows overall improvement in both PSNR and visual quality than before deblocking filtering. Despite the overall improvement, some local part typically suffers from over-filtering, and should be excluded from the general case (that is, due to the over filtering problem in the local part, the quality degrades in the local part, and the local part does not follow the general rule that deblocking filtering improves quality).

Suppose the filter length is "m" for both filters, the Wiener filter coefficient vector for Category I is designated as $W_1=(w_{11}, w_{12}, \ldots w_{1m})$, and the Wiener filter coefficient vector for Category II is designated as $W_2=(w_{21}, w_{22}, \ldots w_{2m})$. The reference from s' is designated as $X=(x_1, x_2, \ldots x_m)$, and the reference from s" is designated as $Y=(y_1, y_2, \ldots y_m)$. And $\hat{s}$ is the filter estimation. The proposed CQALF can be formulated as follows. For Category I:

$$arg_{w_1}\min\|s-\hat{s}\|^2 = arg_{w_1}\min\|s-W_1^T[\omega X+(1-\omega)Y]\|^2 \quad \text{Eq. 1}$$

$$arg_{w_1}\min\Sigma_{i=0}^{M1}\|s_i-W_1^T[\omega X_i+(1-\omega)Y_i]\|^2 \quad \text{Eq. 2}$$

For Category II:

$$arg_{w_2}\min\|s-\hat{s}\|^2 = arg_{w_2}\min\|s-W_2^T Y\|^2 \quad \text{Eq. 3}$$

$$arg_{w_2}\min\Sigma_{i=0}^{M2}\|s_i-W_2^T Y_i\|^2 \quad \text{Eq. 4}$$

Note that s is a pixel from the original image before encoding (for example, from the input picture in FIG. 1), and the filter estimations is a single scalar value as well.

The Eq.1 and 3 provide the filter coefficients for a single pixel, by minimizing the squared magnitude of the error over all possible coefficient vectors.

The Eq.2 and 4 applies to situations involving more than one pixel. For such cases, the equations are applied to each pixel and the squared error for each pixel is summed. The sum is then minimized across all possible coefficient vectors.

More generally, note that the optimization process is also applied across other variables in various implementations, including variables such as, for example, filter length "m". For example, the entire above optimization process is repeated, in one implementation, for several values of "m" and the lowest cost indicates the best value of "m" as well as the best coefficient vectors.

Further, in at least one implementation, the sum of the squared errors across all pixels for a Category is also minimized across all possible values of the weighting factor ω. In one implementation, the weighting factor is set to an initial value, then either Equation 1 (or 2) or Equation 3 (or 4) is applied to the pixels and the sum is minimized using known techniques. Then the weighting factor is set, successively, to different values and the resulting sum is minimized. The lowest "minimized sum" provides the coefficient vector(s).

The deblocking filter intensity (also referred to as the smoothing strength) is frequently controlled by two parameters α and β. The filtering process typically only takes place when the difference between neighboring pixels is smaller than both of the corresponding thresholds α and β. The values of α and β increase as QP increases, and are table-derived in H.264/AVC, with α and β being derived from respective tables. In particular, at the low end of the table where $Index_A<16$ and $Index_B<16$, one or both of α and β are clipped to 0 and filtering is effectively turned off. Note that α is function of IndexA, β is function of IndexB, and IndexA and IndexB both depend on the QP, as is known in the art. When QP is very small, then both α and β will be small, and few pixels will be touched in the deblocking filter due to the small values of α and β. This will result in s' and s" being very much the same. This is a scenario in which the deblocking filter is not filtering many pixels, or is leaving them unmodified. Under such circumstances, Category I is almost empty and it would typically be inefficient to derive a set of coefficients (that is, a filter) for every frame for this category. Therefore, in at least one implementation, we want two noisy observations as diverse as possible (that is, ideally, we want the input and output of the deblocking filter to be notably different from each other) to improve the filtering efficiency.

The inventors have determined that in particular implementations it may be advantageous to increase the deblocking parameters α and β by respective values, referred to as an alpha offset and a beta offset. The values can each be represented by "n", which is typically an integer. For example, in certain implementations, an alpha offset and a beta offset are used to differ the two noisy observations when the QP is small. The increase in these implementations reduces the correlation between the two observations. That is, the increase in alpha and beta increases the difference between the input and the output of the deblocking filter. In these implementations, the increase to alpha and beta typically has less influence at low bit-rate when the QP is high.

In at least one implementation, the alpha offset and the beta offset of a deblocking filter are selected so as to configure the deblocking filter to increase filtering beyond an optimal point of the deblocking filter. That is, the optimal offsets for the deblocking filter are, in certain implementations, zero, but non-zero values are selected for the offsets. The selection of non-zero offsets increases the filtering by the deblocking filter, and increases the difference between the filter input and the filter output for at least some pixels. The larger difference results, in certain implementations, and for at least some pixels, in the pixels being classified into Category I rather than Category II, and, as a result, in the loop filter being applied differently to those pixels.

In at least one implementation, "n" is selected as two, but other values of "n" are used in other implementations. Certain implementations also optimize across some or all possible values of "n". Note that adding two to each of alpha and beta is typically less influential when QP is already large. Typical values of alpha and beta for a low bit-rate case are derived in a table when QP is large (typical QP in a low bit-rate case is larger than 30).

In various implementations, the filter coefficients are optimized across different offsets to α and β. In at least one implementation, the costs of two cases are compared: 1) reference s" produced by a deblocking filter with α and β offset by 0; and 2) reference s" produced by a deblocking filter with α and β offset by 2. The costs are minimized as discussed earlier, by minimizing across all possible values for the coefficient vector (and possibly other variables, such as, for example, the weighting factor). This implementation chooses as a reference the s" that has the lower cost (the values of α and β for the deblocking filter are also implicitly selected). The selection of 1) or 2) is signaled, in various implementations, by a binary bit, assuming that CQALF is finally used (further optimization, for example, results in CQALF not being used, in various implementations).

To be competitive with QALF, various implementations integrate the CQALF scheme into the QALF framework. The classification of frame pixels allows a more adaptable filter design, and usually results in a lower distortion cost, as compared to no classification. However, this classification sacrifices bit rate by transmitting two sets of filter coefficients per frame. From a rate-distortion (RD) optimization point of view, the classification does not guarantee the best RD cost. Consequently, in at least one implementation, for each frame, the cost for a scheme that uses classification (for example, CQALF) is compared with the cost for a scheme that does not use classification (for example, QALF), and the scheme with the lower cost is selected.

Figure 3:
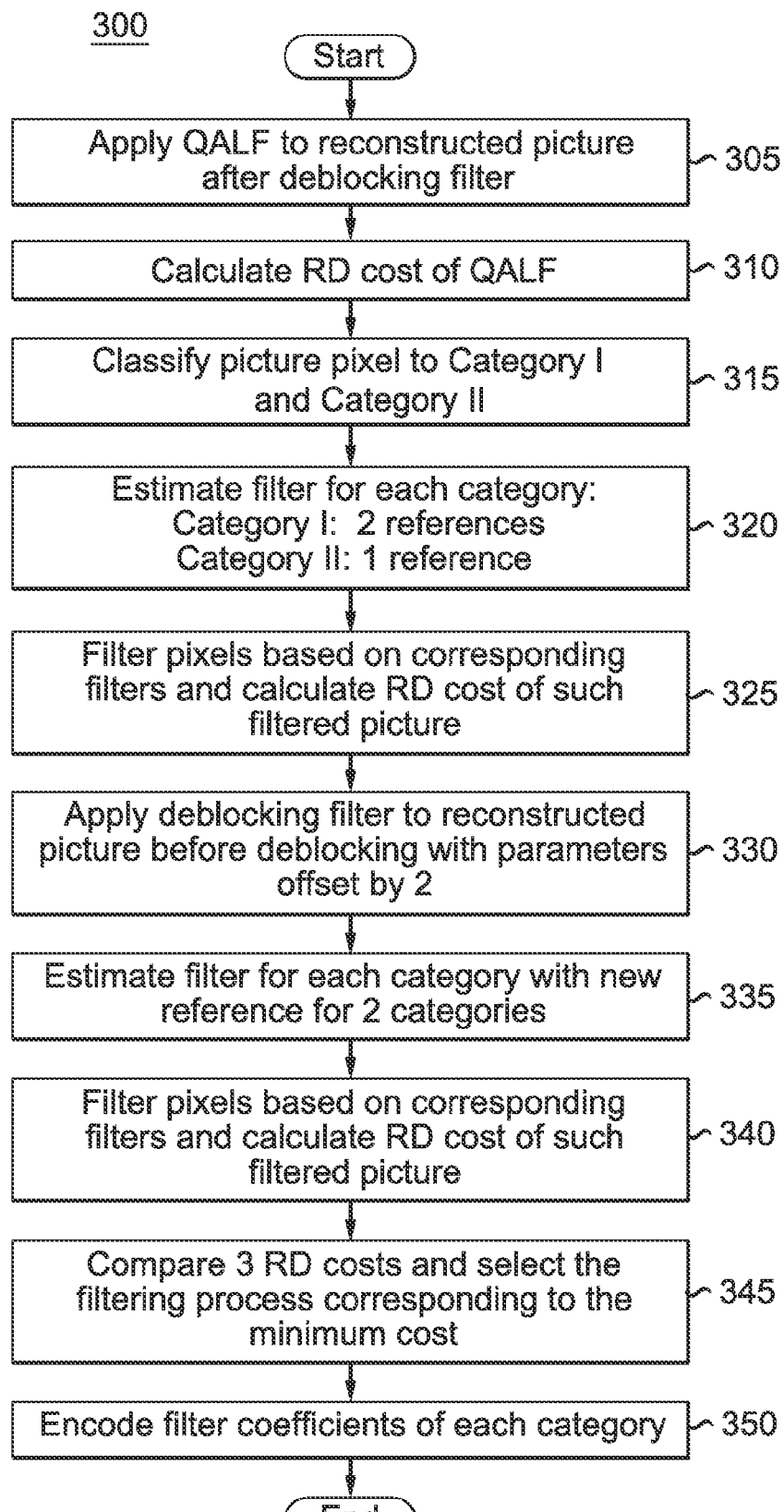
FIG. 3 is a block/flow diagram depicting an implementation of an apparatus and process for encoding.

Referring to FIG. 3, a process 300 is provided for designing and using a filter. The process 300 is performed, in various implementations, in either or both of the adaptive loop filter 167 and the adaptive loop filter 267.

The process 300 includes applying a QALF to a reconstructed picture after a deblocking filter (305). The output of the deblocking filter is, in typical coding applications, a reconstructed picture. The QALF is applied to the output of the deblocking filter in typical implementations. The QALF uses one or more loop filters to selectively filter blocks of the picture. Techniques for designing the QALF are known in the art.

The process 300 includes calculating the RD cost of the QALF (310). Techniques for calculating an RD cost are known in the art, including, for example, determining a value for a Lagrange multiplier. This is the first of three costs that are calculated, and eventually compared, by the process 300.

The process 300 includes classifying the pixels of the picture into either Category 1 or Category 2 (315). This classification is based, for example, on the result (that is, the output) of the deblocking filter. The application of the deblocking filter occurs prior to the operations 310 and 315. It is presumed, for at least one implementation, that the α and β offset are 0 for the application of the deblocking filter.

This classification is performed, for example, as described earlier. For example, in one implementation, we compare reconstructed frames before a deblocking filtering operation (the reconstructed frame is denoted as s') with reconstructed frames after a deblocking filtering operation (the reconstructed frame is denoted as s"), pixel by pixel. Those pixels that are not equal in the two frames are put into Category I. Those pixels that are exactly the same in the two frames are put into Category II.

The process 300 includes determining the filter coefficients for a filter for Category 1 and determining the filter coefficients for a filter for Category 2 (320). Recall that Category 1 uses two references, and that Category 2 uses one reference.

The process 300 includes filtering the pixels of the picture using the appropriate filter for the category of each pixel (325). The filtered pixels are, in at least one implementation a combination of the input to, and the output from, the deblocking filter. The operation 325 further includes calculating the RD cost of the resulting filtered picture (325). This is the second cost that is calculated in the process 300.

The process 300 includes applying the deblocking filter to the picture using α and β offset by 2 (330). The deblocking filter is applied, in typical coding applications, to a decoded picture. This operation 330 typically produces a deblocked picture that is different from that used in the operations 305-325. Note that other implementations offset α and β by a value of "n" that is not restricted to two and can take any value. The process 300 includes determining the filter coefficients for a filter for Category 1 and determining the filter coefficients for a filter for Category 2 (335). This operation 335 is similar to the operation 320. However, this operation 335 is based on a different reference than the operation 320 because the deblocked picture is typically different.

The process 300 includes filtering the pixels of the picture using the appropriate filter for the category of each pixel (340). The filtered pixels are, in at least one implementation a combination of the input to, and the output from, the deblocking filter applied in the operation 330. The operation 340 further includes calculating the RD cost of the resulting filtered picture (340). This operation 340 is similar to the operation 325. This is the third cost that is calculated in the process 300.

The process 300 includes comparing the three RD costs calculated earlier in the process 300 (345). These costs are calculated in the operations 310, 325, and 340. This operation 345 further includes selecting the filtering process (and associated filter(s)) that corresponds to the minimum cost (345). Assuming that there is a minimum, the selected filtering process will be either (i) QALF, (ii) CQALF with α and β offset by 0, or (iii) CQALF with α and β offset by 2. If there is no single minimum (for example, there is a tie), then a filtering process can be selected based on other variables, such as, for example, lower complexity. The associated filter(s) will typically be represented by the coefficients of the one or more loop filters used in the QALF, or the coefficients of the one or more loop filters used in the CQALF.

The process 300 includes encoding the filter coefficients of the one or more filters in the selected filtering process (350). In at least one implementation, the coefficients of two loop filters are encoded when a CQALF filtering process is selected. Other implementations represent the filters using different, or additional, parameters or indicators, and encode those different parameters. For example, certain implementations provide the weighting factor ω in one of variety of techniques. Such techniques include, for example, (i) encoding the actual value of the weighting factor ω, (ii) using a constant value of 0.5 for the weighting factor ω that is not encoded or transmitted because the constant value is known to both the encoder, and (iii) restricting the value of the weighting factor ω to a known set and encoding a flag that indicates the selected weighting factor ω.

Various implementations of the process 300 perform additional operations. For example, in certain implementations, one or more of the following operations is performed: (i) picture data is encoded, the picture data being associated with the reconstructed picture (prior to deblocking) of the operation 305, (ii) applying the selected filtering process from the operation 345 to produce a filtered picture, (iii) storing the filtered picture for use as a prediction reference, (iv) encoding a subsequent picture using the filtered picture as a prediction reference. Note that encoding using a prediction reference is well known in the art and refers to predictive encoding as commonly performed in, for example, AVC. Predictive encoding generally forms an image difference between an input image and a reference image, and encodes the image difference.

Another process, referred to as a process 300a, for designing and using a filter, used in one or more implementations, is described below. The process 300a is similar to the process 300, but has distinctions that are discussed below. The process 300a is performed, in various implementations, in either or both of the adaptive loop filter 167 and the adaptive loop filter 267. The process 300a selects among three general filtering options, which are (i) no loop filtering (see cost $C_0$ below), (ii) QALF with no classification (see cost $C_f$ below), and (iii) QALF with classification (see cost $C_f^1$ below). The process includes:

1. Use a Lagrange multiplier λ to define a cost function J=D+λR. The variable J is the cost, and is also referred to as C. The Lagrange multiplier can be determined in a manner known in the art. Calculate the initial cost $C_0$ when no loop filter is applied to s".
2. Fix the minimal filter tap size at m=5 (5×5 filter window), and optimize the loop filter coefficients by applying the filter to s". This operation begins the process of adding a loop filter using a QALF model, and optimizing that loop filter. The optimization is a local optimization in which one or two variables (but less than all of the variables) are optimized at the same time.
3. Optimize the number of layers and the block size of the quadtree structure while fixing m=5. These are variables from the QALF algorithm, and the optimization of this step is performed in a manner known in the art. Particular implementations perform the optimization in a bottom-up manner. A bottom-up manner typically involves (i) dividing a picture into a smallest block size, assumed for this implementation to be 4×4, (ii) comparing the cost of the sum of four separate 4×4 blocks with the cost of a block formed by merging the four 4×4 blocks into one 8×8 block, (iii) choosing the smaller cost, and (iv) if the smaller cost is the merged block, then the procedure is performed again, repeatedly, for the next higher-level block size until the smaller cost is for the divided blocks or until the maximum allowable block size is reached. Other implementations, for example, perform the procedure for all allowable block sizes and pick the smallest cost.
4. After the number of layers and the block size are determined, optimize the filter tap length m, and calculate the final cost $C_f$ at the optimal block size and the optimal tap length. The filter length, m, options are 5, 7, and 9. The optimal tap length m can be determined by calculating the cost with m successively set to each of 5, 7, and then 9, and finding the tap length m that results in the lowest cost. Note that the local optimization process of steps 2-4 is repeated, in various implementations, a number of times to further optimize one or more of the variables. Additionally, the process is performed, in various implementations, for different size regions. For example, separate loop filter coefficients are determined for each frame, slice, or block, in different implementations.

The above steps 1 through 4 correspond in many respects to an implementation of the operations 305-310 of the process 300. One significant difference, however, is that the steps 1 through 4 compute the cost for an implementation that does not use a loop filter. In contrast, the process 300 does not compute a cost of an implementation that does not use a loop filter.

5. Apply the deblocking filter to s' with $\alpha$ and $\beta$ offset by 0, to produce s''. This step may already have been performed in steps 1 through 4, depending on the values of $\alpha$ and $\beta$ used in steps 1 through 4. Classify the pixels in s'' into Category I pixels and Category II pixels. Fix the minimal filter tap size at m=5, and apply respective loop filters to each category and calculate the cost $C_{\alpha,\beta+0}$. The respective loop filters are as provided in Equations 1 (or 2) and 3 (or 4) above, and are optimized as discussed above with respect to Equations 1 (or 2) and 3 (or 4). Note that this step performs the classification used in CQALF, but does not integrate the classification into the QALF structure. However, other implementations do perform such an integration. For example, one implementation uses the QALF parameters from steps 2 through 4. As another example, an implementation re-optimizes the QALF parameters determined from steps 2 through 4.

6. Apply the deblocking filter to s' with $\alpha$ and $\beta$ offset by n, for some value of "n" that is not zero, to produce a new s''. In typical implementations, a non-zero offset will not have been applied in previous steps. Classify the pixels in the new s'' into Category I pixels and Category II pixels. Fix the minimal filter tap size at m=5, and apply respective filters to each category and calculate the cost $C_{\alpha,\beta+2}$. The respective loop filters are as provided in Equations 1 (or 2) and 3 (or 4) above, and are optimized as discussed above with respect to Equations 1 (or 2) and 3 (or 4). Note that this step performs the classification used in CQALF, but does not integrate the classification into the QALF structure. However, other implementations do perform such an integration. For example, one implementation uses the QALF parameters from steps 2 through 4. As another example, an implementation re-optimizes the QALF parameters determined from steps 2 through 4. As a further example, an implementation uses the same QALF parameters for both steps 5 and 6. In typical implementations, this initial part of step 6 is the same as step 5 above, except that step 6 uses a non-zero offset.

Compare $C_{\alpha,\beta+0}$ and $C_{\alpha,\beta+2}$, and determine which is the lower cost. Choose the s'' that has the lower cost, and use that s'' as one of the two references for the Category I filter. Essentially, the lower cost determines the $\alpha$ and $\beta$ for the deblocking filter. The lower cost also, at least initially, determines the two loop filters.

7. The classification feature of steps 5 through 6 is now integrated with the QALF features. Optimize the number of layers and the block size of the quadtree structure in a bottom-up manner when fixing m=5. These are variables from the QALF algorithm, and the optimization of this step is performed in a manner known in the art. This step is similar to step 3 above.

8. Optimize the filter tap length m as in step 4 above. Calculate the final cost associated with pixel classification. Denote the final cost as $C_f'$. The cost $C_f'$ represents the cost of this CQALF implementation. Further optimization is performed, as explained earlier, in various implementations. For example, in various implementations the filter coefficients are re-optimized.

The above steps 5, 7, and 8 collectively correspond in many respects to an implementation of the operations 315-325 of the process 300. In these operations, and possibly in these steps, the cost is determined for a CQALF process that uses $\alpha$ and $\beta$ offset of zero.

Additionally, the above steps 6 through 8 collectively correspond in many respects to an implementation of the operations 330-340 of the process 300. In these operations, and possibly in these steps, the cost is determined for a CQALF process that uses $\alpha$ and $\beta$ offset of two. One significant difference, however, is that the above step 6 compares two costs, whereas the operations 330-340 do not perform a cost comparison.

9. Compare $C_f$, $C_f'$, and $C_0$. Choose the lowest of the three costs. If $C_0$ is selected, then no adaptive in-loop filter is applied to this frame. If $C_f$ is selected, then QALF is used for this frame. Note that this particular implementation uses a single loop filter for QALF. However, other implementations use multiple loop filters with QALF. If $C_f'$ is selected, then CQALF is used, including a loop filtering process that classifies pixels into two categories and applies different loop filters to each category.

The above step 9 corresponds in many respects to an implementation of the operation 345 of the process 300. In that operation 345, and in step 9, three costs are compared, and the lowest cost is determined. One significant difference, however, is that the above step 9 compares a different set of costs than the operation 345.

Note that there the above steps of the process 300a do not include an encoding operation, such as the operation 350. However, various implementations add a step the process 300a for encoding filter information.

Referring to Table 3, there is shown an implementation of syntax for adaptive loop filter data. In this implementation, the syntax is located in slice header syntax structure. Note that, in this implementation, if both of the two sets of coefficients exist, they are of the same tap size num_of_coeff_luma. The semantics follow for the syntax of Table 3.

cqalf_on_flag

Specifies the use of CQALF for the slice. A value of 1 indicates CQALF is applied for the slice. A value of 0 indicates only QALF is applied for the slice.

cqalf2_on

Specifies the use of deblocking parameters $\alpha$ and $\beta$. A value of 1 indicates $\alpha$ and $\beta$ offset by 2. A value of 0 indicates $\alpha$ and $\beta$ offset by 0.

filter_coeff_luma[i]

Specifies each of the filter coefficients for luminance in QALF and/or in Category I of CQALF.

filter_coeff_luma2[i]

Specifies each of the filter coefficients for luminance in Category II.

pred_coef_mode

"pred_coef_mode" is not a new syntax element, and is defined as is known in the art. Pred_coef_mode is a flag that indicates whether adaptive in-loop filtering is used.

alf tap_size_luma
"alf tap_size_luma" is not a new syntax element, and is defined as is known in the art. Alf_tap_size_luma indicates the tap size, such as, for example, m=5, 7, or 9.

num_of_coef_luma
"num_of_coef_luma" is not a new syntax element, and is defined as is known in the art. Num_of_coef_luma is calculated from alf_tap_size_luma, for example, if alf_tap_size_luma is set equal to five, then num_of_coef_luma is set equal to 5×5=25.

Note that, at least in this implementation, we are not transmitting ω, because ω is set based on the QP of Table 1 at both the encoder and the decoder.

TABLE 3

| adaptive_loopfilter_data { | Descriptor |
| --- | --- |
| pred_coef_mode | u(1) |
| cqalf_on_flag | u(1) |
| cqalf2_on | |
| alf_tap_size_luma | ue(v) |
| for (i=0; i<num_of_coef_luma; i++) { | |
| filter_coeff_luma [i] | se(v) |
| } | |
| If (cqalf_on_flag==1) | |
| for (i=0; i<num_of_coeff_luma; i++) { | |
| filter_coeff_luma2[i] | se(v) |
| } | |
| } | |

Other implementations use different syntax and/or semantics. Additionally, other implementations transmit or store entirely different information. For example, in certain implementations, the decoder performs the filter optimization procedure, so that no filter description needs to be received. In another implementation, the encoder selects among multiple pre-determined sets of filter coefficients, and sends an index to the decoder. The decoder receives the index and accesses the corresponding filter coefficients. The implementation of Table 3 typically provides advantages because the decoder does not perform many computations and is made, in various implementations, with a simple, small footprint, low heat, and low cost design.

Figure 4:
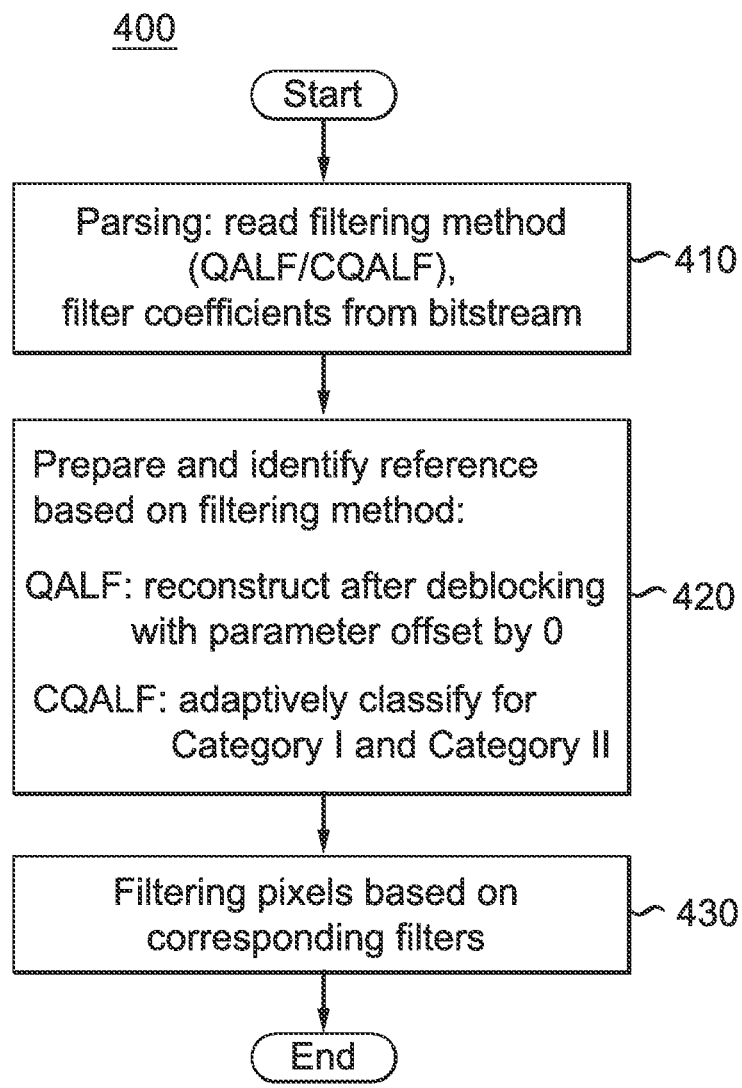
FIG. 4 is a block/flow diagram depicting an implementation of an apparatus and process for decoding.

Referring to FIG. 4, a process 400 is provided for designing a filter at, for example, a decoder. The process 400 is performed, in various implementations, in the adaptive loop filter 267.

The process 400 includes parsing input data (410). The input data is, in various implementations, for example, data received over a transmission channel, data accessed from storage, or data received from a local encoder. In the implementation shown in FIG. 4, the input data includes an indication (for example, the syntax flag cqalf_on_flag from Table 3) of whether the filtering method is QALF or CQALF, and the filter coefficients for one or more loop filters.

In other implementations, the input data includes an indicator of a filtering method that was used, and an indicator of the coefficients of one or more filters. The indicators are, in various implementations, for example, bit flags to indicate a filtering method, bit flags to indicate a set of filter coefficients, and/or actual coefficient values.

Certain implementations also receive encoded picture data over a common bitstream with the data that is parsed in the operation 410. The encoded picture data is, in various implementations, AVC encoded data.

The process 400 includes preparing and identifying one or more references for use in a loop filter (420). In the implementation shown in FIG. 4, if a QALF filter method is indicated from the parsed data of the operation 410, then preparing the reference includes reconstructing a picture after applying a deblocking filter with α and β offset by zero. Identifying the reference is simple for QALF because the reconstructed picture is used as the reference in the loop filter process (although not all pixels will typically be filtered with the loop filter). Further, in the implementation shown in FIG. 4, if a CQALF filter method is indicated from the parsed data of the operation 410, then preparing the references also includes reconstructing a picture after applying a deblocking filter with α and β offset by zero. However, identifying the references includes adaptively choosing the reference(s) for each pixel by classifying each pixel into either Category 1 or Category 2. The references include the reconstructed picture for Category 2, and both the reconstructed picture and the unreconstructed picture (the input to the deblocking filter) for Category 1. Classifying each pixel is performed, for example, as described for the operation 315 or for other implementations in this application.

The picture that is processed in the operation 420 is accessed, in various implementations, from different sources. Sources include, for example, a transmitted bitstream, or a storage device.

Other implementations provide additional features. For example, in one implementation, a cqalf2_on flag is parsed in the operation 410. Further, in the operation 420, if a CQALF filter method is indicated, then the cqalf2_on flag is used to determine the α and β offset for the CQALF filter.

The process 400 includes filtering pixels based on corresponding loop filters (430). In the implementation shown in FIG. 4, if a QALF filter method is indicated from the parsed data of the operation 410, then the pixels of the reconstructed picture (the reference identified in the operation 420) are filtered using the QALF filter coefficients that were parsed in the operation 410. Further, in the implementation shown in FIG. 4, if a CQALF filter method is indicated from the parsed data of the operation 410, then the pixels of the two CQALF references are filtered using the CQALF filter coefficients that were parsed in the operation 410. Filtering the two CQALF references is performed, for example, as described above using one reference Category 2 pixels and using two references for Category 1 pixels.

Various implementations of the process 400 perform additional operations. For example, in certain implementations, one or more of the following operations is performed: (i) picture data is decoded, (ii) the filtered pixels of the operation 430 form a picture that is output to a viewer, or (iii) the filtered pixels of the operation 430 form a picture that is stored and used to decode subsequent encoded pictures.

Another process, referred to as a process 400a, for filtering pixels, used in one or more implementations, is described below. The process 400a is similar to the process 400, but has distinctions that are discussed below. The process 400a is performed, in various implementations, in the adaptive loop filter 267. The process 400a includes:

1. Parse syntax and filter coefficients of an input set of data, such as, for example, a received bitstream. If CQALF has been employed, there will be filter coefficients for two categories (that is, for two filters); otherwise there will be coefficients for one category (that is, for one filter). The filter coefficients relate to, and are for use with, a picture.

2. If CQALF has been employed, classify the pixels of the picture into two categories by comparing s' and s" pixel by pixel (as described earlier); otherwise no classification is performed.
3. If the syntax indicates that the deblocking filter parameters α and β are offset by 2, then applying the deblocking filter to s' with α and β offset by 2 (as described earlier).
4. If CQALF has been employed, then (i) for pixels in Category I, use the two references from s' and s", and filter the pixels with the Category I filter, and (ii) for pixels in Category II, use the reference from s", and filter the pixels with the Category II filter.

Figure 5:
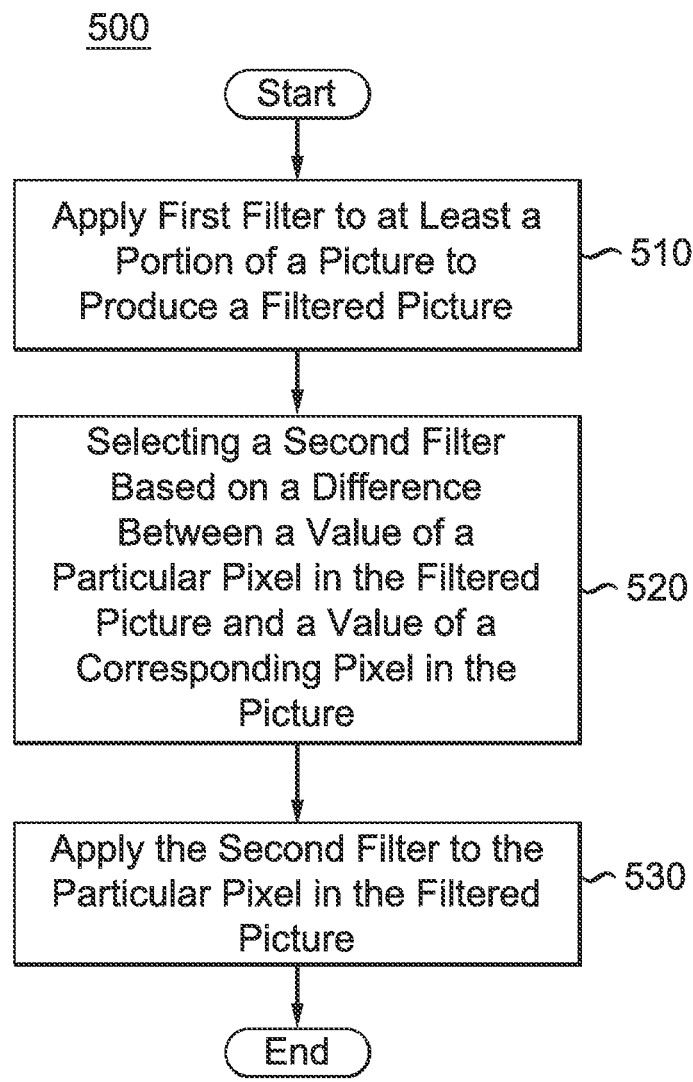
FIG. 5 is a block/flow diagram depicting an implementation of an apparatus and process for filtering.

Referring to FIG. 5, a process 500 is shown for filtering pixels. The process 500 includes applying a first filter to at least a portion of a picture to produce a filtered picture (510). This occurs, in at least one implementation, by filtering a decoded picture using a deblocking filter, as described earlier.

The process 500 includes selecting a second filter based on a difference between a value of a particular pixel in the filtered picture and a value of a corresponding pixel in the picture (520). This occurs, in various implementations, by classifying a pixel as described, for example, in the operations 315 and 420. The classification of the operation 315 and 420 allows selection of an appropriate loop filter. Various implementations select the second filter based on whether the difference is, for example, non-zero, greater than zero, and/or has an absolute magnitude greater than a threshold.

The process 500 includes applying the second filter to the particular pixel in the filtered picture (530). This occurs, in various implementations, by using either a Category 1 Wiener loop filter (see Equations 1 or 2) or a Category 2 Wiener loop filter (see Equations 3 or 4), as described earlier.

Figure 6:
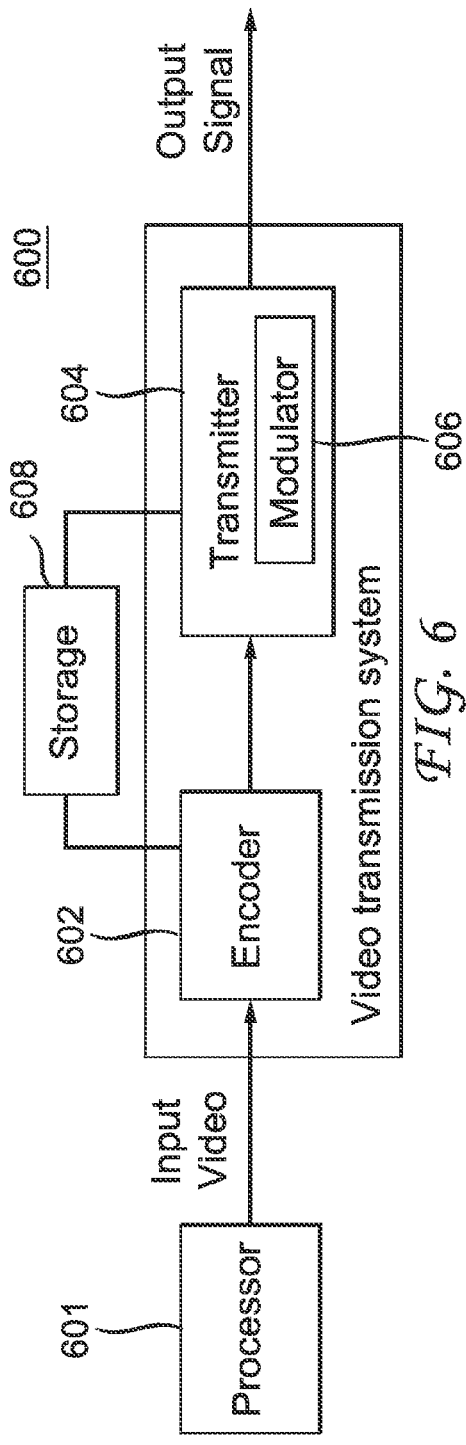
FIG. 6 is a block/flow diagram depicting an implementation of a transmission system and process that may be used with one or more implementations.

Referring now to FIG. 6, a video transmission system or apparatus 600 is shown, to which the features and principles described above may be applied. The video transmission system or apparatus 600 may be, for example, a head-end or transmission system for transmitting a signal using any of a variety of media, such as, for example, satellite, cable, telephone-line, or terrestrial broadcast. The video transmission system or apparatus 600 also, or alternatively, may be used, for example, to provide a signal for storage. The transmission may be provided over the Internet or some other network. The video transmission system or apparatus 600 is capable of generating and delivering, for example, video content and other content such as, for example, indicators of depth including, for example, depth and/or disparity values. It should also be clear that the blocks of FIG. 6 provide a flow diagram of a video transmission process, in addition to providing a block diagram of a video transmission system or apparatus.

The video transmission system or apparatus 600 receives input video from a processor 601. In one implementation, the processor 601 provides still images or video sequences to the video transmission system or apparatus 600. However, in another implementation, the processor 601 is a processor configured for processing images by performing, for example, the operations 305-345, prior to providing images to the encoder 602. In yet another implementation, the processor 601 is configured for performing various operations of the process 300*a* and/or 500. In still another implementation, the processor 601 is configured for performing all or part of the process 400 and/or the process 400*a*, prior to then providing the images to the encoder 602. In further implementations, the processor 601 provides metadata to the video transmission system or apparatus 600 indicating, for example, filter coefficients or filter parameters. Such filter parameters include, for example, cqalf_on_flag, cqalf2_on, the weighting factor ω, and/or specific values for the deblocking parameters α and β.

The video transmission system or apparatus 600 includes an encoder 602 and a transmitter 604 capable of transmitting the encoded signal. The encoder 602 receives video information from the processor 601. The video information may include, for example, video images, and/or disparity (or depth) images. The encoder 602 generates an encoded signal(s) based on the video and/or disparity information. The encoder 602 may be, for example, an AVC encoder. The AVC encoder may be applied to both video and disparity information.

The encoder 602 may include sub-modules, including for example an assembly unit for receiving and assembling various pieces of information into a structured format for storage or transmission. The various pieces of information may include, for example, coded or uncoded video, coded or uncoded disparity (or depth) values, and coded or uncoded elements such as, for example, motion vectors, coding mode indicators, and syntax elements. In some implementations, the encoder 602 includes the processor 601 and therefore performs the operations of the processor 601.

The transmitter 604 receives the encoded signal(s) from the encoder 602 and transmits the encoded signal(s) in one or more output signals. The transmitter 604 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 606. The transmitter 604 may include, or interface with, an antenna (not shown). Further, implementations of the transmitter 604 may be limited to the modulator 606.

The video transmission system or apparatus 600 is also communicatively coupled to a storage unit 608. In one implementation, the storage unit 608 is coupled to the encoder 602, and is the storage unit 608 stores an encoded bitstream from the encoder 602. In another implementation, the storage unit 608 is coupled to the transmitter 604, and stores a bitstream from the transmitter 604. The bitstream from the transmitter 604 may include, for example, one or more encoded bitstreams that have been further processed by the transmitter 604. The storage unit 608 is, in different implementations, one or more of a standard DVD, a Blu-Ray disc, a hard drive, or some other storage device.

Figure 7:
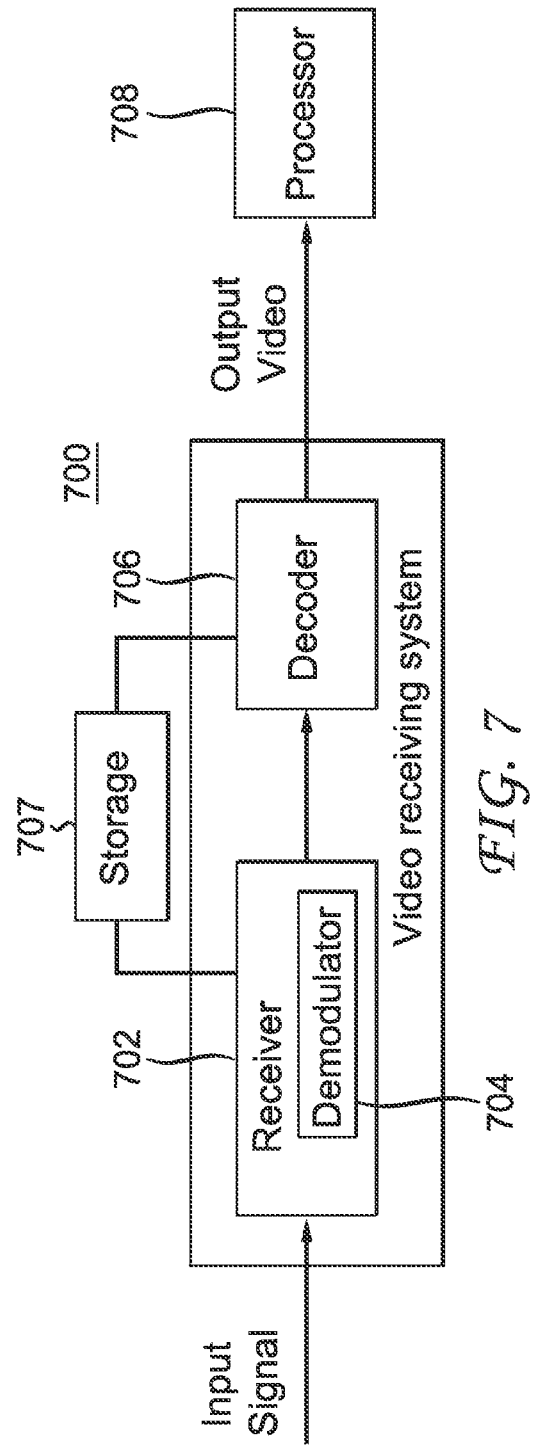
FIG. 7 is a block/flow diagram depicting an example of a receiving system and process that may be used with one or more implementations.

Referring now to FIG. 7, a video receiving system or apparatus 700 is shown to which the features and principles described above may be applied. The video receiving system or apparatus 700 may be configured to receive signals over a variety of media, such as, for example, satellite, cable, telephone-line, or terrestrial broadcast. The signals may be received over the Internet or some other network. It should also be clear that the blocks of FIG. 7 provide a flow diagram of a video receiving process, in addition to providing a block diagram of a video receiving system or apparatus.

The video receiving system or apparatus 700 may be, for example, a cell-phone, a computer, a set-top box, a television, a router, a tablet, or other device that receives encoded video and provides, for example, decoded video signal for display (display to a user, for example), for processing, or for storage. Thus, the video receiving system or apparatus 700 may provide its output to, for example, a screen of a television, a computer monitor, a computer (for storage, processing, or display), a tablet, a cell phone, or some other storage, processing, or display device.

The video receiving system or apparatus 700 is capable of receiving and processing video information, and the video information may include, for example, video images, and/or disparity (or depth) images. The video receiving system or apparatus 700 includes a receiver 702 for receiving an encoded signal, such as, for example, the signals described in the implementations of this application. The receiver 702 receives, in various implementations, for example, a signal providing one or more of a signal output from the video transmission system 600 of FIG. 6, or a signal providing a transmission of a picture output from the process 300. In one implementation, the receiver 702 receives a signal providing data formed according to the syntax of Table 3.

The receiver 702 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 704, de-randomizing the energy in the signal, de-interleaving the data in the signal, and error-correction decoding the signal. The receiver 702 may include, or interface with, an antenna (not shown). Implementations of the receiver 702 may be limited to the demodulator 704.

The video receiving system or apparatus 700 includes a decoder 706. The receiver 702 provides a received signal to the decoder 706. The signal provided to the decoder 706 by the receiver 702 may include one or more encoded bitstreams. The decoder 706 outputs a decoded signal, such as, for example, decoded video signals including video information. The decoder 706 is, in various implementations, for example, an AVC decoder.

The video receiving system or apparatus 700 is also communicatively coupled to a storage unit 707. In one implementation, the storage unit 707 is coupled to the receiver 702, and the receiver 702 accesses a bitstream from the storage unit 707. In another implementation, the storage unit 707 is coupled to the decoder 706, and the decoder 706 accesses a bitstream from the storage unit 707. The bitstream accessed from the storage unit 707 includes, in different implementations, one or more encoded bitstreams. The storage unit 707 is, in different implementations, one or more of a standard DVD, a Blu-Ray disc, a hard drive, or some other storage device.

The output video from the decoder 706 is provided, in one implementation, to a processor 708. The processor 708 is, in one implementation, a processor configured for performing, for example, all or part of the process 300 or all or part of the process 300a. In another implementation, the processor 708 is configured for performing post-processing, such as, for example, de-artifacting or other filtering.

In some implementations, the decoder 706 includes the processor 708 and therefore performs the operations of the processor 708. In other implementations, the processor 708 is part of a downstream device such as, for example, a set-top box, a tablet, a computer, a router, or a television.

A number of implementations provide one or more of the following features:
  (i) A method or apparatus for video encoding and decoding wherein pixels are classified into multiple categories, and each category adaptively employs different references and different filter support is developed to filter pixels in each category.
  (ii) The classification of (i) is based on whether the pixel is a deblocking-filter-touched pixel.
  (iii) A set of filter coefficients is estimated or read for each category of (i).
  (iv) The filter estimation of (iii) is performed by minimizing a measurement criteria between the original picture and the input picture to be processed for pixels within this category.
  (v) The reference of (i) is adaptive for each category.
  (vi) The filter coefficients for each category in (i) are estimated frame by frame, or GOP by GOP, adaptively, and signaled in high level syntax.
  (vii) The filter coefficients for each category in (i) are estimated offline with a set of training data and stored at both an encoder and a decoder.
  (viii) The classification-based directional filtering of (i) is jointly performed with QALF which determines if a pixel should be filtered or not.
  (ix) The filter of (i) is one-dimensional, two-dimensional, or directionally adaptive. A "one-dimensional" filter, in typical implementations, has a vector filter support. A "two-dimensional" filter, in typical implementations, has a matrix filter support. A directionally adaptive filter has support that is different for different directions, and that can be both one-dimensional and/or two-dimensional. The direction selection is based on the pixel content.
  (x) The filter of (i) is separable or non-separable for each category. This typically applies to a two-dimensional filter. In such cases, a separable two-dimensional filter can be applied first to one dimension (for example, the horizontal dimension) and then to a second dimension (for example, the vertical dimension). In contrast, a non-separable two-dimensional filter typically cannot be separated into two one-dimensional filter processes.

It is noted that some implementations have particular advantages, or disadvantages. However, a discussion of the disadvantages of an implementation does not eliminate the advantages of that implementation, nor indicate that the implementation is not a viable and even recommended implementation.

Various implementations generate or process signals and/or signal structures. Such signals are formed, in certain implementations, using pseudo-code or syntax such as that described in the discussion of Table 3. Signals are produced, in various implementations, at the outputs of the processor 601, the encoder 602, the transmitter 604, the receiver 702, the decoder 706, or the processor 708. The signal and/or the signal structure is transmitted and/or stored (for example, on a processor-readable medium) in various implementations.

In a particular implementation, a signal or signal structure includes a first picture portion comprising an encoding of at least a portion of a picture. The signal or signal structure also includes a second picture portion comprising an encoding of at least a portion of a subsequent picture, the portion of the subsequent picture having been encoded based on a version of the picture having a twice-filtered pixel. The twice-filtered pixel is produced by (i) using a first filter to filter a particular pixel in the picture to produce a filtered pixel and (ii) using a second filter to filter the filtered pixel to produce the twice-filtered pixel. The signal or signal structure further includes a filter indication portion that includes an indication of the second filter. The second filter has been selected based on a difference between a value of the particular pixel from the picture and a value of the filtered pixel.

In further variations of the above signal or signal structure, the indication portion includes one or more of a flag, filter parameters, or an indication of a type of filter.

This application provides multiple block/flow diagrams, including the block/flow diagrams of FIGS. 1-7. It should be clear that the block/flow diagrams of this application present both a flow diagram describing a process, and a block diagram describing functional blocks of an apparatus as well as illustrating relationships among the components and outputs of the components. Additionally, this application provides at least the tabular representation in Tables 1, 2, and 3. It should be clear that the tabular representations of Tables 1, 2, and 3 each provide a table of data. However, it should also be clear that Tables 1 and 2 each indicate a separate process for obtaining an optimal value for a variable. Additionally, it should be clear that Table 3 provides a structure for data, and also indicates a process for transmitting data.

Additionally, many of the operations, blocks, inputs, or outputs of the implementations described in this application are optional, even if not explicitly stated in the descriptions and discussions of these implementations. For example, many of the operations of the 300 or of the process 300a can be omitted in various implementations. The mere recitation of a feature in a particular implementation does not indicate that the feature is mandatory for all implementations. Indeed, the opposite conclusion should generally be the default, and all features are considered optional unless such a feature is stated to be required. Even if a feature is stated to be required, that requirement is intended to apply only to that specific implementation, and other implementations are assumed to be free from such a requirement.

We thus provide one or more implementations having particular features and aspects. In particular, we provide several implementations relating to filtering images. Filtering of images, as described in various implementations in this application, can be used in a variety of environments, including, for example, coding images. However, the filtering implementations described, for example the process 500, can be applied to various other environments such as, for example, filtering to remove noise or other artifacts, or filtering to change the resolution of an image. Additionally, variations of these implementations and additional applications are contemplated and within our disclosure, and features and aspects of described implementations may be adapted for other implementations.

A deblocking filter is used in a variety of implementations. Other implementations replace the deblocking filter with a more general de-artifacting filter that reduces one or more artifacts. A de-artifacting filter is, in various implementations, a deblocking filter (that filters out the blockiness artifacts). Other de-artifacting filters include, for example, filters to remove ringing (a de-ringing filter), blurring (a de-blurring filter), color bleeding, stair-case artifacts, color-banding artifacts (a de-banding filter), and Gaussian noise (a de-noising filter).

The loop filter described in many implementations is, for example, a Wiener filter. Other loop filters are used, however, in various implementations in lieu of, or in addition to, a Wiener filter. Such other loop filters include, for example, any de-artifacting filter that aims to reduce an artifact, and non-linear filters. Examples of non-linear filters include transform domain filters (for example, block-matching 3D ("BM3D"), and wavelet-based filters), and temporal filters (for example, motion compensated temporal filtering ("MCTF")).

The deblocking filter used in many implementations is, in other implementations, incorporated into the loop filter. Indeed, by jointly optimizing both the deblocking filter and the loop filter in certain described implementations (for example, in implementations for which α and β are optimized in conjunction with the loop filter coefficients), the filters of these implementations are being treated as a single filter. Thus, reference to a deblocking filter includes, in various implementations, a loop filter that is considered to be part of the deblocking filter.

The description of this application refers frequently to a pixel. Pixels have a location and a value. Pixels in different pictures can also be said to correspond to each other if, for example, they have the same location (co-located) or if they represent the same underlying content. Thus, even pixels that have different locations in two pictures may be said to correspond to each other in various scenarios. Such scenarios include, for example, situations in which one of the pictures is skewed, registered, or transformed, with respect to the other picture. A transformation includes, for example, one or more of a shift or a rotation.

Various implementations describe filtering a pixel. For example, applying the loop filter of Equation 1 to a pixel in s" involves applying an equation to various pixel values in both s' and s". However, the pixel that is actually being filtered, and for which a replacement value is being determined, does not need to be used in the filtering equation. For example, Equation 1 provides a new value for a pixel in s" that has the same location as s in the original picture. However, the reference from s" that is designated as $Y=(y_1, y_2, \ldots y_m)$ need not include the pixel that is co-located with s. For example, Y is composed, in at least one implementation, of only the eight neighbors of the pixel being filtered, and does not include the pixel itself that is being filtered.

Various implementations provide two filters for a given picture, one filter for Category 1 pixels, and another filter for Category 2 pixels. Variations of those implementations, however, provide two filters for smaller or larger units. For example, various implementations provides two filters for every pixel, block, slice, field, or sequence of pictures. Clearly, the choice of the unit size impacts the overhead and processing of the implementation.

Various implementations discuss "deblocking-filter-touched" pixels and "deblocking-filter-untouched" pixels. These designations refer to whether or not the deblocking filter modified the pixel. A pixel can be "untouched" in at least two situations. In a first situation, the pixel is not even filtered by the deblocking filter. In a second situation, the pixel is filtered by the deblocking filter, but the filter does not modify the value of the pixel (the pixel value remains the same, even though the filter was applied to the pixel). In each of these two situations, the pixel is still considered a "deblocking-filter-touched" pixel, that is, an unmodified pixel.

Various implementations perform a classification of pixels based on whether the pixel is modified by a threshold amount. Thus, for example, if a deblocking filter modified a pixel by a small amount (in either a relative or absolute sense, for example), then the pixel would be classified into a separate category. One such implementation classifies pixels into three categories: unmodified, modified by less than a threshold amount (a threshold modification level), modified by at least the threshold amount. A separate filter is determined for each classification in various implementations.

Various implementations perform a classification of pixels that also determines whether at least a threshold number of pixels are in each category. This determination is performed for each unit size, for example, block or picture. If less than half (or some other threshold) of the available pixels are modified, for example, then an appropriate action is taken. Appropriate actions include, for example, not determining a separate filter for that category, or changing the threshold modification level if one was used.

In the above variations, the threshold modification level and/or the threshold number of pixels are determined in various ways. For example, in various implementations, both thresholds are determined based on QP. In one implementation, if QP is large, then it is expected that there will be a lot of modified pixels. Therefore, in that implementation, the thresholds are set higher so that, for example, all of the pixels are not classified into the same category.

In various implementations, pixels in Category 2 use a reference from a single picture, and that picture is selected as the picture from the output of the deblocking filter. However, other implementations use the picture from the input to the deblocking filter to form the reference.

In several described implementations, optimizations are performed. In variations of those implementations, the optimizations are performed for additional values of one or more of the variables, or are performed for additional iterations of a local optimization of multiple variables. In yet other variations, the optimizations are global.

In various implementations selecting a second filter is based on whether a value of a pixel at a pixel location in the filtered picture is different from a value of a pixel at a corresponding pixel location in the picture. Further, in these implementations, the second filter is applied to the pixel location in the filtered picture.

Several of the implementations and features described in this application may be used in the context of the AVC Standard, and/or AVC with the MVC extension (Annex H), and/or AVC with the SVC extension (Annex G). AVC refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (referred to in this application as the "H.264/MPEG-4 AVC Standard" or variations thereof, such as the "AVC standard", the "H.264 standard", "H.264/AVC", or simply "AVC" or "H.264"). Additionally, these implementations and features may be used in the context of another standard (existing or future), or in a context that does not involve a standard.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, evaluating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, evaluating the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map.

Further, many implementations may refer to a "frame". However, such implementations are assumed to be equally applicable to a "picture" or "image".

A "depth map", or "disparity map", or "edge map", or similar terms are also intended to be broad terms. A map generally refers, for example, to a picture that includes a particular type of information. However, a map may include other types of information not indicated by its name. For example, a depth map typically includes depth information, but may also include other information such as, for example, video or edge information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in one or more of an encoder (for example, the encoder 602), a decoder (for example, the decoder 706), a post-processor (for example, the processor 708) processing output from a decoder, or a pre-processor (for example, the processor 601) providing input to an encoder. The processors discussed in this application do, in various implementations, include multiple processors (sub-processors) that are collectively configured to perform, for example, a process, a function, or an operation. For example, the processor 601 and the processor 708 are each, in various implementations, composed of multiple sub-processors that are collectively configured to perform the operations of the respective processors 601 and 708. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, tablets, cell phones, portable/personal digital assistants ("PDAs"), and other devices that facilitate communication of information between end-users. A processor may also include multiple processors that are collectively configured to perform, for example, a process, a function, or an operation. The collective configuration and performance may be achieved using any of a variety of techniques known in the art, such as, for example, use of dedicated sub-processors for particular tasks, or use of parallel processing.

Implementations of the various processes and features described herein may be embodied in a variety of different equipment or applications, particularly, for example, equipment or applications associated with data encoding, data decoding, view generation, depth or disparity processing, and other processing of images and related depth and/or disparity maps. Examples of such equipment include an encoder, a decoder, a post-processor processing output from a decoder, a pre-processor providing input to an encoder, a video coder, a video decoder, a video codec, a web server, a set-top box, a router, a laptop, a personal computer, a tablet, a cell phone, a PDA, and other communication devices. As should be clear, the equipment may be mobile and even installed in a mobile vehicle.

Additionally, the methods may be implemented by instructions being performed by a processor (or by multiple processors collectively configured to perform such instructions), and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding video data, comprising:
applying a first filter to at least a portion of a picture to produce a filtered picture, wherein the picture is generated based on prediction data and residual data as an initial reconstructed picture at an encoder;
selecting a second filter based on a difference between a value of a particular pixel in the filtered picture and a value of a corresponding pixel in the initial reconstructed picture, wherein the corresponding pixel in the initial reconstructed picture is filtered by the first filter to produce the particular pixel in the filtered picture, wherein the selecting includes:
  classifying the particular pixel in the filtered picture based on the difference between the value of the particular pixel in the filtered picture and the value of the corresponding pixel in the initial reconstructed picture, and
  selecting the second filter based on a result of the classifying;
applying the second filter to the particular pixel in the filtered picture to produce a twice-filtered pixel in a second filtered picture;
encoding parameters for the second filter into a bitstream at the encoder; and
encoding at least a portion of a subsequent picture, based on a version of the second filtered picture having the twice-filtered pixel.

2. The method of claim 1 wherein applying the second filter comprises:
filtering the particular pixel in the filtered picture to generate a first value;

filtering the corresponding pixel in the picture to generate a second value; and generating a third value, corresponding to the particular pixel, in the second filtered picture, based on a weighted sum of the first value and the second value.

3. The method of claim 1, wherein the particular pixel in the filtered picture is classified into a first category if the difference exceeds a threshold, and wherein the particular pixel in the filtered picture is classified into a second category if the difference does not exceed the threshold.

4. The method of claim 1 wherein the first filter comprises a de-artifacting filter.

5. The method of claim 4 wherein the de-artifacting filter comprises a deblocking filter.

6. The method of claim 5 wherein the deblocking filter is configured to increase filtering beyond an optimal point of the deblocking filter, thereby increasing the difference and impacting the selecting operation.

7. The method of claim 1 wherein selecting the second filter is further based on an indication of a number of pixels in the filtered picture that exhibit differences in value from values of corresponding pixels in the picture.

8. An apparatus for encoding video data, comprising at least a memory and one or more processors, the one or more processors configured for performing at least the following:
applying a first filter to at least a portion of a picture to produce a filtered picture, wherein the picture is generated based on prediction data and residual data as an initial reconstructed picture at an encoder;
selecting a second filter based on a difference between a value of a particular pixel in the filtered picture and a value of a corresponding pixel in the initial reconstructed picture, wherein the corresponding pixel in the initial reconstructed picture is filtered by the first filter to produce the particular pixel in the filtered picture, wherein the selecting includes:
classifying the particular pixel in the filtered picture based on the difference between the value of the particular pixel in the filtered picture and the value of the corresponding pixel in the initial reconstructed picture, and
selecting the second filter based on a result of the classifying;
applying the second filter to the particular pixel in the filtered picture to produce a twice-filtered pixel in a second filtered picture;
encoding parameters for the second filter into a bitstream at the encoder; and
encoding at least a portion of a subsequent picture based on a version of the second filtered picture having the twice-filtered pixel.

9. A non-transitory processor readable medium having stored thereon a signal structure, the signal structure comprising:
a first picture portion comprising an encoding of at least a portion of a picture, wherein the picture is generated based on prediction data and residual data as an initial reconstructed picture at an encoder or as an initial decoded picture at a decoder;
a second picture portion comprising an encoding of at least a portion of a subsequent picture, the portion of the subsequent picture having been encoded based on a version of the picture having a twice-filtered pixel, wherein the twice-filtered pixel is produced by (i) using a first filter to filter a particular pixel in the picture to produce a filtered pixel and (ii) using a second filter to filter the filtered pixel to produce the twice-filtered pixel, wherein the second filter is selected based on a result of a classification of the filtered pixel that is based on a difference between a value of the particular pixel from the picture and a value of the filtered pixel; and
a filter indication portion comprising an encoding of parameters for the second filter.

10. The apparatus of claim 8 wherein the one or more processors are configured to:
filter the particular pixel in the filtered picture to generate a first value;
filter the corresponding pixel in the picture to generate a second value; and
generate a third value, corresponding to the particular pixel, in the second filtered picture based on a weighted sum of the first value and the second value.

11. The apparatus of claim 8 wherein the one or more processors are configured to:
classify the particular pixel in the filtered picture into a first category if the difference exceeds a threshold; and
classify the particular pixel in the filtered picture into a second category if the difference does not exceed the threshold.

12. The apparatus of claim 8 wherein the first filter comprises a de-artifacting filter.

13. The apparatus of claim 12 wherein the de-artifacting filter comprises a deblocking filter.

14. The apparatus of claim 13 wherein the deblocking filter is configured to increase filtering beyond an optimal point of the deblocking filter, thereby increasing the difference and impacting the selecting operation.

15. The apparatus of claim 8 wherein the one or more processors are configured to select the second filter based on an indication of a number of pixels in the filtered picture that exhibit differences in value from values of corresponding pixels in the picture.

16. A method for decoding video data, comprising:
applying a first filter to at least a portion of a picture to produce a filtered picture, wherein the picture is generated based on prediction data and residual data as an initial decoded picture at a decoder;
selecting a second filter based on a difference between a value of a particular pixel in the filtered picture and a value of a corresponding pixel in the initial decoded picture, wherein the corresponding pixel in the initial decoded picture is filtered by the first filter to produce the particular pixel in the filtered picture, wherein the selecting includes:
classifying the particular pixel in the filtered picture based on the difference between the value of the particular pixel in the filtered picture and the value of the corresponding pixel in the initial decoded picture, and
selecting the second filter based on a result of the classifying;
applying the second filter to the particular pixel in the filtered picture to produce a twice-filtered pixel in a second filtered picture; and
decoding at least a portion of a subsequent picture, based on a version of the second filtered picture having the twice-filtered pixel.

17. The method of claim 16, wherein applying the second filter comprises:
filtering the particular pixel in the filtered picture to generate a first value;
filtering the corresponding pixel in the picture to generate a second value; and generating a third value, corresponding to the particular pixel, in the second filtered picture, based on a weighted sum of the first value and the second value.

18. The method of claim 16, wherein the particular pixel in the filtered picture is classified into a first category if the difference exceeds a threshold, and wherein the particular pixel in the filtered picture is classified into a second category if the difference does not exceed the threshold.

19. The method of claim 16, wherein the first filter comprises a de-artifacting filter.

20. The method of claim 16, wherein the de-artifacting filter comprises a deblocking filter.

21. The method of claim 20, wherein the deblocking filter is configured to increase filtering beyond an optimal point of the deblocking filter, thereby increasing the difference and impacting the selecting operation.

22. The method of claim 16, wherein selecting the second filter is further based on an indication of a number of pixels in the filtered picture that exhibit differences in value from values of corresponding pixels in the picture.

23. An apparatus for decoding video data, comprising at least a memory and one or more processors, the one or more processors configured to:
   apply a first filter to at least a portion of a picture to produce a filtered picture, wherein the picture is generated based on prediction data and residual data as an initial decoded picture;
   classify a particular pixel in the filtered picture based on a difference between a value of the particular pixel in the filtered picture and a value of a corresponding pixel in the initial decoded picture, wherein the corresponding pixel in the initial decoded picture is filtered by the first filter to produce the particular pixel in the filtered picture;
   select a second filter based on a result of the classifying;
   apply the second filter to the particular pixel in the filtered picture to produce a twice-filtered pixel in a second filtered picture; and
   decode at least a portion of a subsequent picture based on a version of the second filtered picture having the twice-filtered pixel.

24. The apparatus of claim 23, wherein the one or more processors are configured to:
   filter the particular pixel in the filtered picture to generate a first value;
   filter the corresponding pixel in the picture to generate a second value; and
   generate a third value, corresponding to the particular pixel, in the second filtered picture based on a weighted sum of the first value and the second value.

25. The apparatus of claim 23, wherein the one or more processors are configured to:
   classify the particular pixel in the filtered picture into a first category if the difference exceeds a threshold; and
   classify the particular pixel in the filtered picture into a second category if the difference does not exceed the threshold.

26. The apparatus of claim 23, wherein the first filter comprises a de-artifacting filter.

27. The apparatus of claim 26, wherein the de-artifacting filter comprises a deblocking filter.

28. The apparatus of claim 27, wherein the deblocking filter is configured to increase filtering beyond an optimal point of the deblocking filter, thereby increasing the difference and impacting the selecting operation.

29. The apparatus of claim 23, wherein the one or more processors are configured to select the second filter based on an indication of a number of pixels in the filtered picture that exhibit differences in value from values of corresponding pixels in the picture.

* * * * *